United States Patent [19]
Loebs et al.

[11] 4,042,204
[45] Aug. 16, 1977

[54] APPARATUS FOR BONDING A BRONZE BUSHING ON A METALLIC MEMBER

[75] Inventors: Richard G. Loebs, Peoria; Richard C. Ostrowski, Dunlap, both of Ill.

[73] Assignee: Caterpillar Tractor Co., Peoria, Ill.

[21] Appl. No.: 609,644

[22] Filed: Sept. 2, 1975

Related U.S. Application Data

[62] Division of Ser. No. 494,970, Aug. 5, 1974, Pat. No. 3,937,268.

[51] Int. Cl.$^2$ ............................ B22C 9/06; B22C 9/24
[52] U.S. Cl. .......................................... 249/57; 249/87; 249/108; 249/134; 249/144; 249/165; 164/DIG. 2
[58] Field of Search ............... 249/57, 87, 105, 108, 249/144, 160, 163, 165, 134; 228/257; 164/66, 80, 98, DIG. 2, 339, 341, 342

[56] References Cited
U.S. PATENT DOCUMENTS

| | | | |
|---|---|---|---|
| 153,923 | 8/1874 | Andrews | 249/144 X |
| 481,952 | 9/1892 | Ingram | 249/57 X |
| 560,711 | 5/1896 | Gulich | 249/144 X |
| 731,632 | 6/1903 | Tomson et al. | 249/87 |
| 926,231 | 6/1909 | Barber | 249/144 |
| 1,852,332 | 4/1932 | Perry | 249/108 X |
| 2,066,247 | 12/1936 | Brownback | 164/98 X |
| 2,812,571 | 11/1957 | Strom | 249/57 X |
| 2,923,987 | 2/1960 | Clark et al. | 249/87 |
| 3,590,904 | 7/1971 | Woodburn, Jr. | 249/134 X |

FOREIGN PATENT DOCUMENTS

| | | | |
|---|---|---|---|
| 1,190,642 | 4/1965 | Germany | 249/108 |

*Primary Examiner* — Ronald J. Shore
*Attorney, Agent, or Firm* — Phillips, Moore, Weissenberger, Lempio & Majestic

[57] ABSTRACT

An annular bronze bearing is bonded to a cylindrical inner surface of a metallic member by positioning the member in a fixture to define an annular chamber therein, communicating a charge of bronze alloy particles to the chamber via an open end thereof, melting the alloy and cooling the member and alloy to form the bearing. The apparatus comprises a pair of plates adapted to clamp the metallic member therebetween to define the annular chamber between the member and a cylindrical core. A ceramic funnel is secured on the upper one of the plates to communicate the melted bronze alloy particles to the annular chamber via the open end thereof.

5 Claims, 4 Drawing Figures

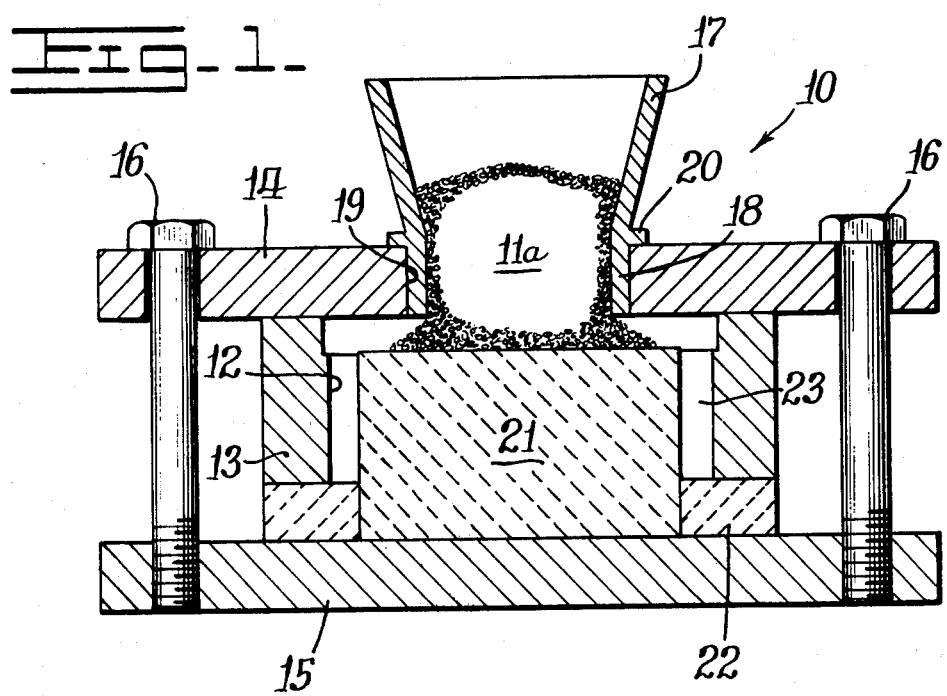
Fig-1-
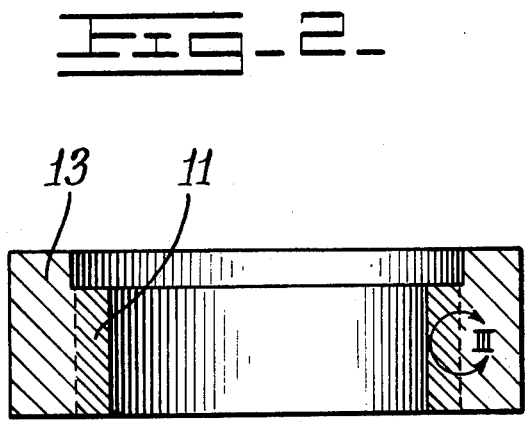
Fig-2-

Fig-3-
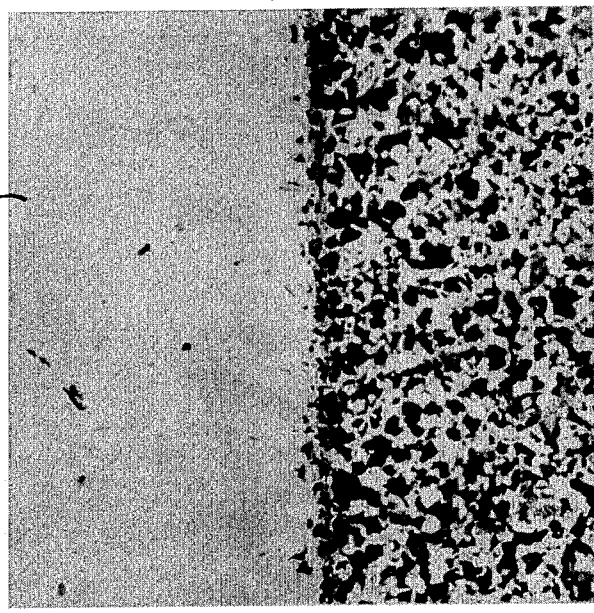
(100x)
Fig-4-
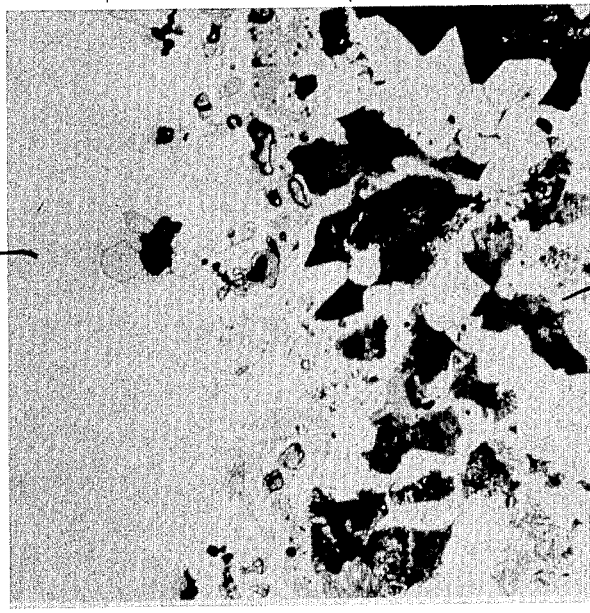
(500x)

APPARATUS FOR BONDING A BRONZE BUSHING ON A METALLIC MEMBER

CROSS REFERENCE TO RELATED APPLICATION

This application is a divisional of U.S. patent application Ser. No. 494,970, filed on Aug. 5, 1974 by Richard G. Loebs et al. for "Method for Bonding a Bronze Bushing on a Metallic Member", now U.S. Pat. No. 3,937,268.

BACKGROUND OF THE INVENTION

Hydraulic pumps and motors of the radial piston type may comprise a rotor which is rotatably mounted on a stationary pintle valve. A typical pump of this type is disclosed in U.S. patent application Ser. No. 425,192, filed on Dec. 17, 1973 by William Carl Engel for "High Pressure Radial Piston Flud Translating Device and Cylinder Construction Therefor", now U.S. Pat. No. 3,878,767. Such application, assigned to the assignee of this application, is adapted to operate at a maximum speed approximating 12,000 rpm with internal fluid pressures reaching levels as high as 7,500 psi.

A conventional sleeve bearing is normally disposed in a bore formed in the rotor to rotatably mount the rotor on a pintle valve. Many such bearings exhibit a relatively short life expectancy due to their separation from the rotor as a result of continued use at high speeds and subjection thereof to high operating pressures in the range mentioned above. Methods and apparatus for forming bearings of this type are disclosed in U.S. Pat. Nos. 3,280,758; 3,707,035; and 3,709,108.

SUMMARY OF THIS INVENTION

An object of this invention is to provide a method and apparatus for economically and expeditiously forming an annular bearing on a cylindrical surface of a metallic member. The method comprises: positioning the member in a fixture to define an annular chamber, open at one end thereof; communicating a charge of bearing alloy to the open end of the chamber in a quantity sufficient to at least substantially fill the chamber; melting the bearing alloy in the chamber; and cooling the metallic member and melted bearing alloy to ambient temperature to bond the bearing to the metallic member. The apparatus comprises a pair of plates adapted to clamp the metallic member therebetween. A funnel is secured to an upper one of the plates to communicate the charge of bearing alloy to the open end of the chamber, defined between the member and a non-metallic core member.

BRIEF DESCRIPTION OF THE DRAWINGS

Other objects and advantages of this invention will become apparent from the following description and accompanying drawings wherein:

FIG. 1 is a cross sectional view in elevation illustrating an apparatus and method for bonding an annular bearing on a cylindrical inner surface of a metallic member;

FIG. 2 is a cross sectional view of the metallic member, subsequent to the bonding of a bronze bearing thereon;

FIG. 3 is a photomicrograph, taken within circle III in FIG. 2 and magnified 100X, illustrating a diffusion band and bond between the metallic member and bronze bearing; and FIG. 4 is a view similar to FIG. 3, but illustrating the diffusion band at a magnification of 500X.

DETAILED DESCRIPTION

FIG. 1 illustrates an apparatus 10 for bonding an annular bronze bearing or bushing 11 (FIG. 2) on a cylindrical inner surface 12 of a cylindrical metallic member 13. The member may be composed of a SAE 4140C steel, for example, adapted to be employed as a rotor in the type of pump disclosed in above-referenced U.S. patent application Ser. No. 425,192. The fixture comprises a pair of circular cover and support plates 14 and 15, respectively, adapted to clamp member 13 therebetween by means of circumferentially disposed bolts 16.

A conically shaped and detachable ceramic funnel means 17 has a lower tubular end 18 thereof disposed in a mating bore 19 formed through the cover plate. An annular flange 20 abuts the upper plate to retain the conically shaped funnel portion of the funnel means in its proper position for feeding particles 11a, constituting bronze bearing 11, into the fixture. A cylindrical non-metallic core 21 is disposed centrally on support plate 15 and has an annular non-metallic graphite support member 22 disposed on the support plate to circumvent the lower end of the core.

Member 13 is supported on member 22 and defines an annular chamber 23 along with core 21, open only at its upper end, adapted to have melted particles 11a communicated thereto to form bearing 11 (FIG. 2). If so desired, the top surface of core 21 could be formed into a conical configuration facing upwardly to aid in guiding particles 11a into chamber 23. Core 21 and support member 22 are each entirely composed of a non-metallic material, such as graphite, (or at least surface coated therewith) to prevent bonding thereof to bearing 11. Also, the fixture could be suitably reconstructed by one skilled in the art to form chamber 23 about the outer cylindrical periphery of member 13 to form bearing 11 thereon.

The method for forming the FIG. 2 rotor will now be described. Prior to assembly of member 13 in the fixture, its inner cylindrical surface 12 is suitably cleaned of oxides, oils and other extraneous matters to induce a sound metallurgical bond thereat. Member 13 is positioned about core 21 and on support member 22 prior to the clamping of cover plate 14 thereon by bolts 16. Subsequent to such clamping, whereby chamber 23 is defined between the core and member 13, a predetermined quantity of bronze alloy 11a is deposited in funnel 17 in a quantity sufficient to completely fill chamber 23.

The loaded fixture is then placed in a suitable furnace (not shown) which preferably provides a non-oxidizing, protective atmosphere, such as 0.40 carbon potential endothermic, exothermic or cracked ammonia atmosphere, to prevent oxidation of cylindrical bonding surface 12. In one application, the member and particles were heated to approximately 1950° F. for 30 minutes to melt the particles for gravity flow from funnel 17 into annular chamber 23. The intimate contact of the molten bronze alloy with surface 12 caused diffusion of the alloy into such surface to form a metallurgical bond therebetween, illustrated by a diffusion band D in FIGS. 3 and 4.

After the heating period has expired, the furnace is allowed to cool to a temperature below approximately 1,500° F. to insure solidification of the bronze alloy and to permit the furnace to be opened without risking an explosion of the protective atmosphere therein. After further cooling to room temperature, bolts 16 are removed to disassemble the fixture to permit removal of the completed FIG. 2 rotor. FIGS. 3 and 4 are photomicrographs illustrating a metallurgical bond between an SAE 4140C steel member 13 and a bronze alloy 11, essentially comprising 90 percent copper and 10 percent tin.

It should be understood that such bearing alloy may comprise a "commercial bronze" or a "genuine bronze", such as the composition mentioned above. For example, such a commercial bronze may comprise a silicone bronze, an aluminum bronze, a manganese bronze or a like composition of the bronze family. However, it is preferable for application of the teachings of this invention to employ a genuine bronze (e.g., 90 percent copper and 10 percent tin) due to the compatability thereof for heat-treating purposes. As shown in FIGS. 3 and 4, in one application diffusion band D had a width approximating 0.0003 to 0.0005 inches and was found to reveal traces of molybedenum and phosphorous therein.

Subsequent to rough machining, the FIG. 2 rotor with its bearing 11 bonded thereto is then heat-treated by heating it to a maximum temperature approximating 1540° F. and thereafter oil-quenched to room temperature. The rotor assembly may be then tempered at 950° F. for approximately 2 to 3 hours to achieve the desired physical characteristics thereof. It has been found that the metallurgical bond at diffusion band D is enhanced during austenitizing by a solid state diffusion reaction occurring during heat treatment. Subsequent thereto, the rotor assembly is final machined and dimensioned to adapt the rotor assembly for installation in a radial piston pump.

We claim:

1. An apparatus for bonding a bearing on an annular member comprising a cover plate having a single bore formed centrally therethrough, a support plate spaced axially downwardly from said cover plate, fastening means extending through said cover plate and releasably attached to said support plate for releasably attaching said cover and support plates together, single funnel means attached to said cover plate to extend through the bore formed centrally therethrough and communicating internally of said apparatus for communicating a meltable material therein, and a non-metallic core mounted on said support plate to extend upwardly therefrom in close proximity to and below a lower end of said funnel means to define a space therebetween which extends laterally beyond a lower end of said funnel means.

2. The apparatus of claim 1 wherein said funnel means comprises a lower tubular end mounted in mating relationship in the bore formed through said cover plate, a conically shaped funnel portion extending upwardly above said cover plate and an annular radial flange disposed axially between said tubular end and said funnel portion and abutting said cover plate for positioning the funnel means on said apparatus.

3. The apparatus of claim 1 wherein said core is cylindrical.

4. The apparatus of claim 3 further comprising an annular non-metallic support member mounted on said support plate to circumvent a lower end of said core and a cylindrical metallic member circumventing said core to define a cylindrical chamber therebetween solely communicating at its upper end with the space defined between the lower end of said funnel means and said core, said cylindrical metallic member being clamped between said cover and support plates by said fastening means and wherein said fastening means comprises a plurality of bolts circumventing said cylindrical metallic member.

5. The apparatus of claim 3 wherein said core and said support member are each composed of graphite.

* * * * *